United States Patent Office 2,957,457
Patented Oct. 25, 1960

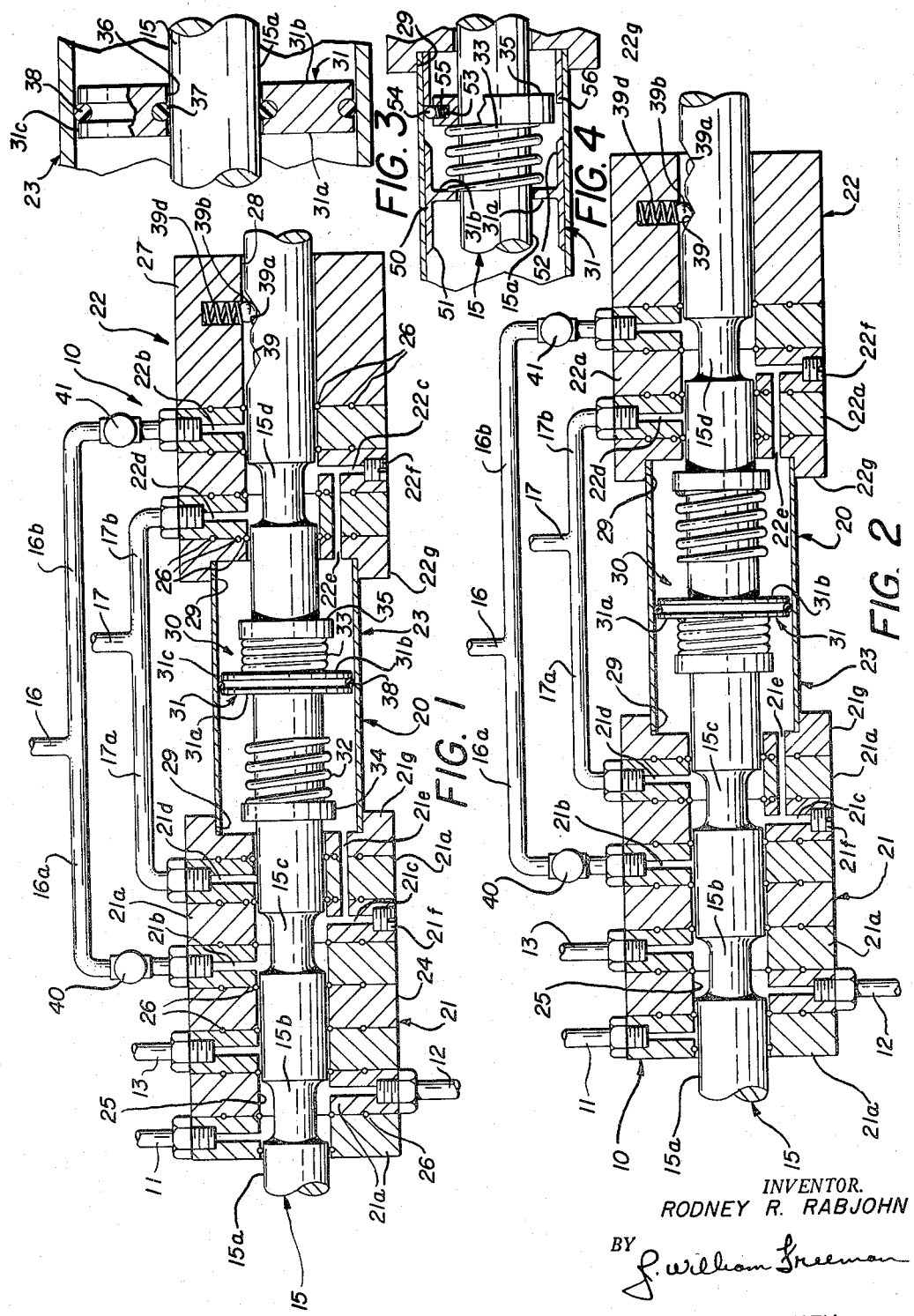
Oct. 25, 1960   R. R. RABJOHN   2,957,457
REVERSING VALVE MECHANISM
Filed Sept. 8, 1954
INVENTOR.
RODNEY R. RABJOHN
BY
ATTORNEY

2,957,457

REVERSING VALVE MECHANISM

Rodney R. Rabjohn, 311 Wheeler St., Akron, Ohio

Filed Sept. 8, 1954, Ser. No. 454,694

6 Claims. (Cl. 121—164)

This invention relates to valving mechanisms, and in particular, relates to that type of reversing valve mechanism known conventionally as "three-way valves."

In the known prior art, "three-way valves" have long been employed to control the entrance of fluid into hydraulically operated mechanisms of one form or another. This type of valve normally employs a diverter mechanism that is capable of diverting fluid flow upon having the position thereof changed. The usual arrangement in this type of valve is that the inlet port thereof is blocked off upon movement of the diverter mechanism, thus permitting exhaust of fluid through the simultaneously opened exhaust port of the "three-way valve."

In the past, movement of this diverter mechanism has generally been accomplished by the use of means that were separate and distinct from the valve body itself. Representative mechanisms that have been employed in this regard include solenoid actuators and cam actuating mechanisms. Such prior art devices have had the distinct disadvantage of being expensive in original construction as well as in the operation thereof, due to the fact that the same have required elaborate mechanical structures to effectuate movement of the diverter mechanisms.

Accordingly, it is one object of this invention to provide a "three-way valve" having the diverter mechanism thereof actuated between "open" and "closed" positions upon the passage of constant pressure fluid therethrough.

It is a further object of this invention to provide a "three-way valve" that is automatically reversible upon flow of fluid therethrough.

It is a still further object of this invention to provide a "three-way valve" that is automatically reversible upon fluid flow therethrough, and being further characterized by the fact that the period of retention in any one position may be adjusted.

It is a still further object of this invention to provide a "three-way valve" that has the reversing mechanism thereof actuated by the passage of hydraulic fluid therethrough.

It is a still further object of this invention to provide a "three-way valve" of simplified construction resulting in extreme economy in initial cost and ease of upkeep.

These and other objects of the invention will become more apparent upon a reading of the following brief specification, considered and interpreted in the light of the accompanying drawings.

Of the drawings:

Figure 1 is a sectional view illustrating the improved reversing valve in the "open" position.

Figure 2 is a sectional view illustrating the improved reversing valve in "closed" position.

Figure 3 is an enlarged sectional view illustrating the mounting of the pressure disc upon the spool shaft of the reversing valve.

Figure 4 is an enlarged sectional view illustrating a modified form of pressure disc.

Referring now to the drawings, and in particular, to Figures 1 and 2 thereof, the improved reversing valve, generally designated as 10, is shown adapted to control the flow of fluid in a series of conduits 11, 12 and 13. The arrangement of the conduits 11, 12 and 13 is such that the conduit 11 is illustrated as being a supply line for a fluid actuated hydraulic cylinder (not shown) that is connected to the valve 10 through the conduit 12. The conduit 13 is illustrated as being an exhaust conduit for fluid that is exhausted from the hydraulic cylinder in known manner. As a result of this arrangement, it is manifest that fluid entering the conduit 11 in the position of Figure 1 will be diverted into the conduit 12 for actuation of the hydraulic cylinder (not shown). When the valving mechanism is positioned as shown in Figure 2 of the drawings, the supply line 12 will be closed and fluid from the hydraulic cylinder will pass through the lines 12 and 13 for exhaust with respect to the valve 10. The aforementioned supply system is merely representative of a wide varitey of similar valving mechanisms that can be utilized in accordance with the teachings of this invention; and accordingly, it is to be understood that the representative embodiment illustrated in these drawings does not limit the scope or extent of the novel reversing valve as will hereinafter be described.

Considering now the structure of the valve 10, per se, the same is shown in Figures 1 and 2 of the drawings as including a spool shaft 15 that is illustrated as being axially reciprocal with respect to a valve body 20 upon the energization of a valve reversing mechanism 30, that is actuated as a result of fluid flow through a supply conduit 16 and an exhaust conduit 17.

The valve body 20 as is illustrated in the drawings as being of three-piece construction, wherein a pair of spaced end walls 21 and 22 are interconnected by a cylindrical spacer 23, so as to define an overall valve body 20 of cylindrical construction, the arrangement being such that each said end wall member serves as a point of ingress and egress for the actuating fluid that is provided in the conduits 16 and 17; while the spacer cylinder 23 receives the valve reversing mechanism 30 interiorly thereof in a manner to be described.

To this end, the end wall 21 is shown as being of laminated construction wherein a plurality of discs 21a, 21a, are arranged in axially abutting relationship to define a common external cylindrical surface 24, together with a common internal aperture 25 that is designed for reception of the spool shaft 15 in a manner to be described. Three of the abutting discs just described are shown apertured as at 21b, 21c, and 21d to provide communication between the surface 24 and the surface 25. The arrangement of the apertures 21b, 21c and 21d is such that the aperture 21b connects with a branch 16a of the conduit 16, while the aperture 21d is connected to an equivalent branch 17a of the exhaust conduit 17. By like token, the aperture 21c is shown in Figures 1 and 2 of the drawings as interconnecting with an axial bore 21e that in turn interconnects the aperture 21c with the interior of the spacer cylinder 23, a plug 21f being provided in aperture 21c to seal off the exposed external end thereof.

The end wall 22 is of similar construction to that of the end wall 21, except that the same is "opposite hand" in construction. Accordingly, the end wall 22 is shown defined by a plurality of disc segments 22a, 22a that are aligned in abutting axial relationship with respect to each other to form a similar laminated construction. As before, actuating fluid is supplied with respect to the end wall 22 through a plurality of apertures 22b, 22c and 22d that are shown provided in axially successive discs, and as before, a branch 16b of the supply conduit 16 interconnects with the aperture 22b, while branch 17b of the exhaust conduit 17 interconnects with the aperture 22d. The communication between the interior of the end wall 22 and the interior of the spacer cylinder 23 is accomplished, as before, by an aperture 22e that interconnects aperture 22c, a plug 22f being provided to seal off the external end of the aperture 22c.

Because of the laminated construction of the end walls 21, 22, a plurality of resilient O rings, generally designated as 26, 26 are shown provided between the abutting faces of the adjacent discs 21a, 21a, and 22a, 22a. Additional O rings 26, are placed in the valve body 20 at appropriate points of engagement with the spool shaft 15 in known manner, it being understood that the illustrated use of these O rings is representative and that further use or non-use of the same could be employed without the exercise of invention. The external cylindrical surface 27 and the internal aperture 28 of the end wall 22 are again defined by the abutting discs 22a, 22a and are illustrated as being axially aligned with the surfaces 24 and 25, respectively, of the end wall 21. For permitting reception of the spacer cylinder between the end walls 21, 22, the extreme inner discs 21g, 22g of the end walls 21 and 22 are also illustrated as being undercut as at 29, 29 (see Figure 1).

As has been indicated, the spool shaft 15 is received interiorly of the end walls 21 and 22 in axially shiftable relationship therewith, and accordingly, the same (spool shaft 15) is illustrated in the drawings as having the external diameter 15a thereof slidingly received against the axially aligned surfaces 25 and 28 of the end walls 21 and 22. Additionally, the spool shaft 15 is shown undercut as at 15b, 15c and 15d to define a series of reduced diameters that permit the flow of fluid therearound in a manner to be described. For purposes to be described, one free end of the spool shaft 15 is shown notched as at 39, 39a to receive a spring-loaded ball detent that restricts the axial movement of the spool shaft 15 with respect to the valve body 20.

To the end of reciprocating the spool shaft 15 axially of the valve body 20 as the same is defined by the end walls 21 and 22, the spool shaft 15 is shown provided with a reversing mechanism 30 that is generally defined by a pressure-responsive disc 31 that has the opposed faces 31a, 31b thereof engaged by springs 32, 33, respectively. These springs are engaged against shoulders 34, 35 that are fixed to the spool shaft 15. The pressure responsive disc 31 is illustrated in Figure 3 of the drawings as being axially shiftable with respect to the spool shaft 15, whereby the same may move axially thereof independent of movement of the spool shaft 15, upon the application of pressure against a face of said pressure responsive disc 31. The external diameter 31c of the disc 31 is illustrated in Figure 3 as approximating internal diameter of the spacer cylinder 23, while the aperture 36 thereof is illustrated as approximating the external diameter 15a of the spool shaft 15. Connection of the disc 31 between the spacer cylinder 23 and spool shaft 15 is illustrated as being accomplished by the use of O rings 37, 38 that permit the same (disc 31) to move axially with respect to both the spacer cylinder 23 and spool shaft 15. (See Figure 1.)

While the supply conduit 16 has been generally described in the preceding paragraphs, the same is further characterized by the presence, in branches 16a, 16b, of metering valves 40, 41, that are operable to restrict the amount of fluid entering the end walls 21, 22 through branches 16a, 16b, respectively. In this manner, control over the duration of "open" and "closed" positions is accomplished as will be described.

In use or operation of the improved valve mechanism, it will first be assumed that the component parts of the valve mechanism are in the position of Figure 1 of the drawings. In this position fluid entering the conduit 11 will pass around the reduced diameter portion 15b of the spool shaft 15 for entrance into the conduit 12 so as to be directed towards a hydraulic cylinder, for example. During the period that the valve is in this position, a second source of pressurized fluid will be supplied through the supply conduit 16 and will pass through the branch 16a thereof for entrance to the end wall 21 through the aperture 21b. Fluid entering the end wall 21 through aperture 21b will pass around the reduced diameter portion 15c and will then enter the interior of the spacer cylinder 23 through apertures 21c, 21e. As the fluid enters the interior of the spacer cylinder 23 the pressure thereof will be exerted against the left-hand face 31a of the pressure disc 31, and as this pressure increases with the subsequent entrance of additional fluid as just described, the force thereof will cause the disc 31 to move somewhat to the right towards the position of Figure 1. This movement results in compression of the spring 33 against shoulder 35 with the result that the shoulder 35, that is fixed to the spool shaft 15, will be subjected to the influence of pressure tending to move the same to the right of Figure 1. Initially, such movement is resisted by the action of the ball detent 39b within the notch 39a; which engagement prevents any axial shifting of the spool shaft 15 with respect to the valve body 20. As the pressure increases interiorly of cylinder 23, however, the combined force of the additional pressure, together with the expanding force created by the compressed spring 33 will overcome the force provided by the spring 39d of the ball detent, and the spool shaft 15 will be urged to the right to the position of Figure 2.

Such movement of the shaft to the right of Figure 2 will result in aperture 21b being closed to the entrance of fluid from supply conduit 16 and will further result in the opening of aperture 22b to permit the entrance of fluid from conduit 16. (See Figure 2.) Previous to this just described movement, fluid that is confined to the right of the disc 31 interiorly of the spacer cylinder 23, will be exhausted from this confined space through apertures 22e, 22c and 22d for return to the exhaust line 17 through branch 17b.

With the valve in the position of Figure 2, the entrance of fluid will be reversed from that just described, and fluid from the conduit 16 will now enter into the end wall 22 and will be exhausted from end wall 21. In this position, the fluid will enter the interior of the spacer cylinder 23 through conduits 22b, 22c and 22e and will accordingly, create a pressure against the opposite face 31b of the disc 31. As this pressure increases as before described, the disc 31 will move to the left of Figure 2, resulting in compression of the spring 32 against the shoulder 34. During the period of this movement, fluid will be exhausted from the chamber to the left of the sealed disc 31 through apertures 21e, 21c and 21d. As the pressure to the right of the disc 31 continues to build up, the same, together with the force exerted by spring 32 will urge the spool shaft 15 to the left of Figure 2 and eventually the force of spring 39b that is operating to retain the ball detent within the notch 39, will be overcome and the spool shaft 15 will return to the position of Figure 1 for repetition of the just described cycle of operation.

During the preceding operation, it is manifest that the duration of each cycle of operation will be approximately equal, due to the fact that the branches 16a, 16b are of equivalent construction. When it is desired to increase the duration of any such cycle of operation, either metering valve 40 or 41 may be regulated to control the amount of fluid entering the respective end walls 21 or 22 in a given time period. Thus, for example, the valve 40 may be regulated to decrease the amount of fluid flowing into end wall 21 with the result that it will take a greater length of time to build up sufficient pressure to move the disc 31 to the right of Figure 1. As a result of this delayed pressure, build-up fluid will pass into conduit 12 for a greater length of time than normally occurs during unrestricted flow through branch 16a. It follows that if branch 16b is not metered by valve 41, that the time element for returning the valve from the position of Figure 2 to the position of Figure 1 will be less than the time period required to move from the position of Figure 1 to the position of Figure 2. It is believed manifest that either time period could easily be similarly adjusted to any desired length by use of the metering valves 40 and 41.

In the preceding paragraphs there has been described a novel reversing valve that is automatically actuated between a plurality of positions upon the flow of fluid therethrough. It has been shown how a pressure-responsive disc operates under the influence of hydraulic fluid to effectuate this reversal, and further, how the pressure-responsive disc is urged past "dead-center" points by the use of springs that serve as accumulators for the requisite energy surge needed to push the pressure-responsive disc past the "dead-center" positions. It has been further shown how the novel reversing valve described herein is automatic in operation and simplified as to construction wherein the use thereof is economical.

In Figure 4 of the drawings there is illustrated a modified form of the invention wherein a slightly different type of retaining mechanism is employed to restrain movement of the pressure-responsive disc with respect to shaft 15 until such time as sufficient pressure has been built up by the accumulator springs to move the disc 31 past the "dead-center" position. Accordingly, where indicated, like numerals indicate like parts of that form of the invention shown in Figures 1–3 of the drawings.

As indicated, the pressure-responsive disc 31 is modified to include an annular flange 50, provided at the outer radial circumference of the disc 31 and included opposed tapered engagement edges 51 and 52 for purposes to be described. The shoulder 35 is modified to include at least one recess 53 for reception therein of a ball 54 that is spaced with respect thereto by a spring 55. The shoulder 34 (not shown) is similarly modified, while both opposed ends of the spacer cylinder 23 are provided with a spacer ring 56 that engages the ball 54.

In use of this modified form of the invention, pressure against surface 31a of disc 31 causes the same to move to the right and compress spring 33 as before. As the disc 31 continues this movement to the right of Figure 4, spring 33 is further compressed, and eventually the engagement edge 52 of disc 31 strikes ball 54. As further movement of the disc 31 to the right of Figure 4 continues, the ball will be urged radially inwardly of the shoulder 35 against the force of spring 55, and eventually the same (ball 54) will be out of contact with spacer ring 56, at which time shoulder 35, together with shaft 15, will rapidly move to the right to what is the equivalent of Figure 2. The reverse movement may be accomplished in similar manner with engagement edge 51 operating to disengage the ball 54 of shoulder 34 (not shown) from engagement with the opposed spacer 56.

In the preceding paragraphs it has been indicated how the retaining mechanism can be modified without effecting the operation of the novel valve. It follows that equivalent accumulator means could be provided in lieu of the springs 32, 33, by using a pressure accumulator in lines 16a, 16b (Figures 1, 2), for example. By like token, while the end walls 21, 22 have been illustrated as being of segmented construction, it is manifest that a single casting could be employed with equivalent results. Similarly, while the pressure-responsive feature of this invention has been illustrated in the form of a disc 31, it is manifest that a diaphragm arrangement could be substituted therefore with equivalent result, with the diaphragm member moving relatively of the shaft member, even though the same were secured thereto.

Throughout the specification the word "fluid" has been used as representative of the pressurized medium that is employed in conjunction with the teachings of this invention. It is to be understood that this word is used in the sense that the same indicates air, water, or any other fluid medium of similar scope.

Accordingly, other modifications of the invention may be resorted to without departing from the spirit thereof or the scope of the appended claims.

What is claimed is:

1. An actuating device for shifting the spool shaft of a valve body that includes, a closed axial chamber of circular cross-section, disposed about the axis of said spool shaft so as to surround an axial length of the same and having a source of pressurized fluid provided adjacent at least one axial end thereof; said actuating device comprising; a pressure-responsive disc, disposed around said shaft in axially shiftable relationship therewith and having the peripheral edge portions thereof disposed adjacent the internal wall of said chamber, whereby the same is divided into axially adjacent subchambers; and accumulator means carried by said shaft for engagement with said disc and axially shifting said spool shaft relatively of said bore after a predetermined amount of relative movement of said disc on said shaft has occurred.

2. An actuating device for shifting the spool shaft of a valve body that includes, a closed axial chamber of circular cross-section, disposed about the axis of said spool shaft so as to surround an axial length of the same and having a source of pressurized fluid provided adjacent at least one axial end thereof; said actuating device comprising; a pressure-responsive disc, disposed around said shaft in axially shiftable relationship therewith and having the peripheral edge portions thereof disposed adjacent the internal wall of said chamber, whereby the same is divided into axially adjacent subchambers; and accumulator means carried by said shaft for engagement with said disc and axially shifting said spool shaft relatively of said bore after a predetermined amount of relative movement of said disc on said shaft has occured; said accumulator means including a pair of axially spaced shoulders fixed to said shaft; a pair of coil springs positioned on opposite sides of said pressure-responsive disc to engage said shoulders upon axial movement of said disc with respect to said shaft.

3. An actuating device for shifting the spool shaft of a valve body that includes, a closed axial chamber of circular cross-section, disposed about the axis of said spool shaft so as to surround an axial length of the same and having a source of pressurized fluid provided adjacent at least one axial end thereof; said actuating device comprising; a pressure-responsive disc, disposed around said shaft in axially shiftable relationship therewith and having the peripheral edge portions thereof disposed adjacent the internal wall of said chamber, whereby the same is divided into axially adjacent subchambers; and accumulator means carried by said shaft for engagement with said disc and axially shifting said spool shaft relatively of said bore after a predetermined amount of relative movement of said disc on said shaft has occured; said accumulator means including a pair of axially spaced shoulders fixed to said shaft; a pair of coil springs positioned on opposite sides of said pressure-responsive disc to engage said shoulders upon axial movement of said disc with respect to said shaft; and retaining means operable to restrict the axial movement of said shaft upon engagement between one said shoulder and one said spring.

4. The device of claim 1 further characterized by the fact that said retaining means includes a ball detent carried by said valve body and being tensionally engageable with said shaft.

5. The device of claim 1 further characterized by the fact that said retaining means includes a ball detent carried by said shoulder and being tensionally engaged by said dics.

6. The device of claim 1 further characterized by the fact that the perimetric edge portions of said disc engage said shaft and said internal wall of said chamber in sealing contatct therewith.

References Cited in the file of this patent

UNITED STATES PATENTS

| | | |
|---|---|---|
| 1,802,324 | Bartlett | Apr. 28, 1931 |
| 1,920,003 | Chenault | July 25, 1933 |
| 2,443,568 | Palm | June 15, 1948 |
| 2,537,680 | Kupiel | Jan. 9, 1951 |
| 2,539,147 | Loucks | Jan. 23, 1951 |
| 2,672,886 | Crookston | Mar. 23, 1954 |
| 2,745,387 | Dinkelkamp | Mar. 15, 1956 |